(12) United States Patent
Paterson et al.

(10) Patent No.: US 6,857,014 B1
(45) Date of Patent: Feb. 15, 2005

(54) METHOD AND SYSTEM FOR DESIGNING A NETWORK

(75) Inventors: Robert K. Paterson, Ottawa (CA); Allan I. Sand, Woodlawn (CA); Anthony L. Mar, Gloucester (CA)

(73) Assignee: Nortel Network Limited, St. Laurent (CA)

( * ) Notice: Subject to any disclaimer, the term of this patent is extended or adjusted under 35 U.S.C. 154(b) by 0 days.

(21) Appl. No.: 09/469,623

(22) Filed: Dec. 22, 1999

(51) Int. Cl.⁷ .......................................... G06F 15/173
(52) U.S. Cl. ................... 709/223; 709/221; 709/222
(58) Field of Search ........................... 709/221–224, 709/238, 246, 248, 204, 241, 232, 229; 703/2, 3, 13, 4; 710/8; 706/25; 700/286; 707/103; 365/735, 736; 713/1; 714/25; 370/238, 254, 400; 455/446, 422, 448

(56) References Cited

U.S. PATENT DOCUMENTS

| | | | | |
|---|---|---|---|---|
| 5,564,109 A | * | 10/1996 | Snyder et al. ................ | 710/8 |
| 5,611,020 A | * | 3/1997 | Bigus .......................... | 706/25 |
| 5,798,939 A | * | 8/1998 | Ochoa et al. ............... | 700/286 |
| 6,023,571 A | * | 2/2000 | Matsumoto et al. .......... | 703/2 |
| 6,058,260 A | * | 5/2000 | Brockel et al. .............. | 703/4 |
| 6,058,262 A | * | 5/2000 | Kawas et al. ................ | 703/13 |
| 6,144,727 A | * | 11/2000 | Mashinsky ............. | 379/114.02 |
| 6,195,697 B1 | * | 2/2001 | Bowman-Amuah ......... | 709/224 |
| 6,243,747 B1 | * | 6/2001 | Lewis et al. ................ | 709/222 |
| 6,374,202 B1 | * | 4/2002 | Robinson ..................... | 703/13 |
| 6,393,290 B1 | * | 5/2002 | Ufongene .................... | 455/446 |
| 6,446,200 B1 | * | 9/2002 | Ball et al. ..................... | 713/1 |
| 6,493,751 B1 | * | 12/2002 | Tate et al. ................... | 709/221 |
| 6,510,139 B1 | * | 1/2003 | Yoshida ...................... | 370/238 |
| 6,535,227 B1 | * | 3/2003 | Fox et al. .................... | 345/736 |
| 6,535,923 B1 | * | 3/2003 | Giroir ......................... | 709/241 |
| 6,628,622 B1 | * | 9/2003 | Bulick et al. ................ | 370/254 |
| 6,662,221 B1 | * | 12/2003 | Gonda et al. ............... | 709/223 |

OTHER PUBLICATIONS

Ash et al; An Analytical Model for Adaptive Routing Networks, IEEE 1993.*
Terse : A Tool For Evluating Software Reliability Models–Mei–Hwa Chen ; ftp.cs.purdue.edu/pub/serc/tech–reports/By–Project/misc/TR142P.PS.Z.*
Medhi, A Unified Framework for Survuable Telecommunications Network Design, IEEE 1992.*

* cited by examiner

*Primary Examiner*—Thong Vu

(57) ABSTRACT

The present invention provides a novel system and method for designing a network. The system is preferably a computer operable to allow a user to input the nodes and links of a network, and to input product information associated with the nodes and links. The computer also stores product-reliability models corresponding to the hardware information. The computer is operable to perform operations that consider the nodes, links, product models to determine a set of reliability performance parameters. The computer can be further operable to vary certain reliability parameters to determine the impact from the perspective of an end-user or other type of network client. One method can include the collection of desired client requirements from the end-user and designing various network configurations to conform with the desired client requirements. Thus, the present invention can be used, and to optimize network designs. Another application is to incorporate the tool in network management product to be used to build or enhance existing networks. This function could be both static as well as dynamic. Thus, the present invention can also be used for other purposes such as modifying, monitoring or optimising existing networks.

31 Claims, 4 Drawing Sheets

METHOD AND SYSTEM FOR DESIGNING A NETWORK

FIELD OF THE INVENTION

The present invention relates generally to networks and more particularly relates to a system and method for designing a networks.

BACKGROUND OF THE INVENTION

A well-known type of network is the Public Switched Telephone Network ("PSTN"). The PSTN was originally intended to carry voice communications over telephone lines, however, they are increasingly used to carry electronic data, such as facsimile transmissions and/or modem communications. The internet is another network that is gaining enormous popularity. The internet has typically been used to carry electronic data. However, as bandwidths increase and digitization (such as MPEG) improves, the Internet will increasingly be used to carry voice and video communications. In general, it can be seen that known networks are converging. For example, the distinction between PSTN and Internet will become less meaningful as a single type of network becomes capable of carrying voice, fax, video, data and other forms of electronic communications.

It is also known that networks have failure-modes, or, from the user's perspective, all networks have a certain amount of reliability. It is known to measure network reliability in terms of percentage of time that the network is available ("Availability Measurement"). A common expression of availability measurement is "Five-Nines Availability", which generally means that the network is available 99.999% of the time, as averaged over a specified period of time. An availability measurement can be used in a variety of ways. For example, network customers purchasing or leasing networks may specify their required availability measurement, and in turn, network designers may use this availability measurement to design and test the network to ensure that it meets the needs of the network customer.

Availability measurements can be useful in designing and or measuring PSTN's that are used for carrying non-critical voice telephone calls, because a user simply needs to know that there is a dial-tone and thus that the user can make a voice telephone call. Accordingly, where the PSTN has "Five-Nines Availability", then a user can expect a dial-tone to be available 99.999% of the time.

However, an availability measurement may not be useful in designing or measuring networks transporting critical applications. For example, a "Five-Nines Availability" may not be acceptable for voice access, because the availability measurement does not reflect other measurements such as failure frequency, failure duration and failure impact:—all critical attributes to users of networks. (As is known to those of skill in the art, such measurements can also be referred to as "metrics" or "parameters"). If, for instance, the "Five-Nines" is five, one-minute subscriber access outages in a year, then user-downtime requirements and cut-off calls requirements are generally met. If, however, the "Five-Nines" is one-hundred-and-fifty, two-second outages, then the subscriber outage requirements are met but ineffective call-attempt requirements and dropped-call requirements are generally not met. Continuing with the example, if the "Five-Nines" is one, thirty-minute outage every six years that causes a 30,000 subscriber outage then the user-downtime requirements are not met and the network owner needs to submit a report to the FCC that outlines the corrective and preventive action.

The foregoing example shows how an availability measurement can be unhelpful in designing PSTNs, but it will now be apparent to those of skill in the art that such availability measurements are even further ineffectual in the design, monitoring and optimization of more modem, multi-service networks that carry fax, data, voice, video, audio and other forms of electronic communications. It will be further apparent that the foregoing problems are exacerbated where services are delivered to the user across multiple networks controlled by various different network providers.

SUMMARY OF THE INVENTION

It is therefore an object of the present invention to provide a novel method and system for designing networks that obviates or mitigates at least one of the disadvantages of the prior art.

In one embodiment of the invention there is provided a method for use in designing a network, the method comprising the steps of:

receiving data representing a plurality of nodes interconnected by at least one link, the nodes and arcs being representative of the network;

receiving data representative of network products used to implement the network;

determining at least one reliability parameter for at least one of the products and the network based on an operation that considers the products, the network and a predefined set of product-reliability models associated with the products; and presenting the determined at least one reliability parameter.

In a particular aspect of the first embodiment, there is provided the further step of receiving data representative of a desired reliability parameter and modifying the products and the network until the determined reliability parameter substantially matches the desired reliability parameter.

The present invention provides a novel system and method for designing a network. The system is preferably a computer operable to allow a user to input the nodes and links of a network, and to input product information associated with the nodes and links. The computer also stores product-reliability models corresponding to the hardware information. The computer is operable to perform operations that consider the nodes, links, product models to determine a set of reliability performance parameters. The computer can be further operable to vary certain reliability parameters to determine the impact from the perspective of an end-user or other type of network client. One method can include the collection of desired client requirements from the end-user and designing various network configurations to conform with the desired client requirements. Thus, the present invention can be used, and to optimise network designs. Another application is to incorporate the tool in network management product to be used to build or enhance existing networks. This function could be both static as well as dynamic.

The present invention can also be used for other purposes such as modifying, monitoring or optimising existing networks.

BRIEF DESCRIPTION OF THE DRAWINGS

The present invention will now be explained, by way of example only, with reference to certain embodiments and the attached Figures, in which.

DETAILED DESCRIPTION OF THE INVENTION

Figure 1:
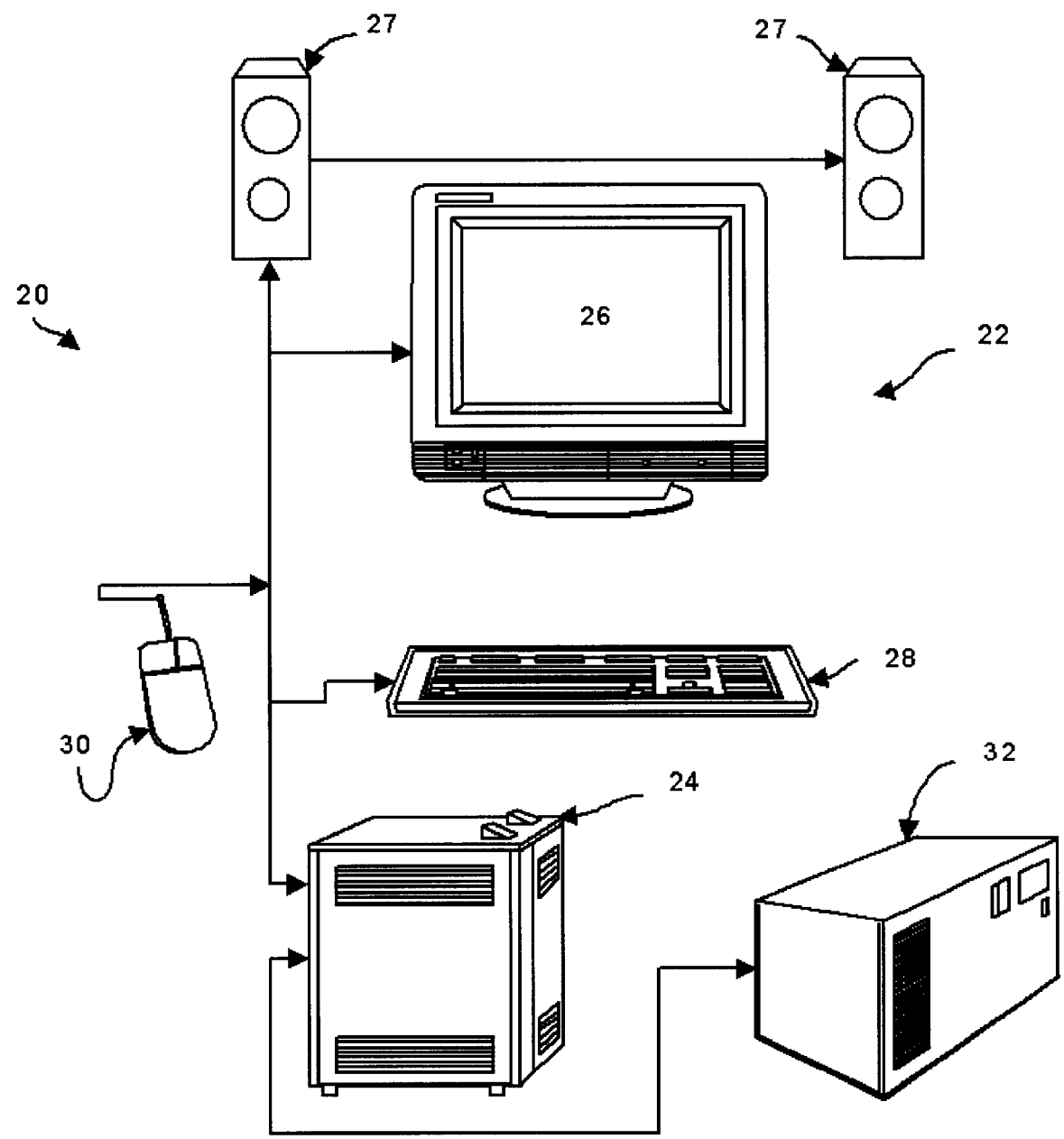
FIG. 1 is system for designing a network in accordance with an embodiment of the invention.

Referring now to FIG. 1, a system for designing a network is indicated generally at 20. In a present embodiment, system 20 is a computer 22 having a processing unit 24 that generates user-output to one or more user-output devices, which in a present embodiment includes a monitor 26 and speakers 27. Monitor 26 can be a cathode-ray tube, an electroluminescent display, an active matrix display and/or any other user-output display device, as will occur to those of skill in the art. Processing unit 24 receives user-input from user-input devices which in a present embodiment include a keyboard 28 and a pointing-device or mouse 30. Processing unit 24 is connected to a persistent storage device which in a present embodiment is a hard-disc drive 32.

One suitable configuration of processing unit 24 includes a mother-board bearing a Pentium III microprocessor, one-hundred-and-twenty-eight megabytes of random access memory, and a video-output card that generates signals for presentation as an image on monitor 26, and an audio output card that generates signals for presentation of sound on speakers 27. Other configurations of computer 22 and/or processing unit 24 will occur to those of skill in the art.

Figure 2:
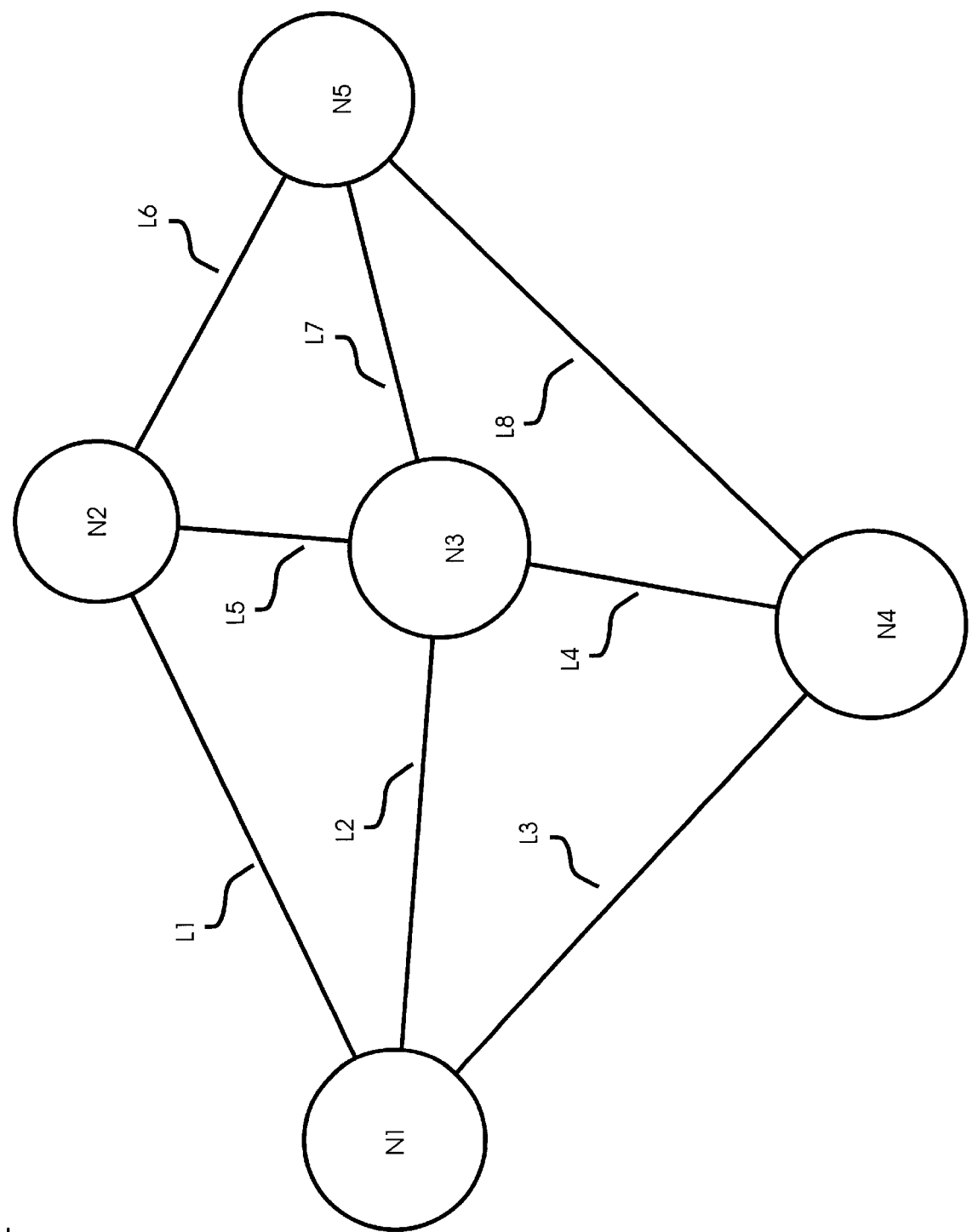
FIG. 2 is an exemplary network of nodes and arts that can be inputted into and displayed on the system of FIG. 1.

Processing unit 24 is operable to receive data, via keyboard 28 and/or mouse 30, that represents a network. Referring now to FIG. 2, an exemplary network is indicated at 40. Network 40 includes a plurality of nodes N1, N2 . . . N5, each of which are interconnected by links L1, L2, . . . L8. In a presently preferred embodiment, each node N1, N2 . . . N5 represents locations throughout network 40. Similarly, each link L1, L2, . . . L8 is representative of desired paths of network communication between each node N1, N2 . . . N5. It is to be understood that any direct link between any pair of nodes can be included, or omitted, as desired. For example, a direct link between nodes N2 and N4 could also be included. Further, link L4 between nodes N3 and N4 can be omitted. Overall, it should be understood that network 40 can be any desired configuration.

Processing unit is further operable to receive product information associated with each node N1, N2 . . . N5 and link L1, L2, . . . L8. It is to be understood that the term "products" collectively refers to the actual hardware and the software executable thereon. For example, each node N1, N2 . . . N5 is typically composed of a collection of switching-products, such as routers, which interact to allow each node N1, N2 . . . N5 to perform switching and related functions on network 40. Similarly, each link L1, L2, . . . L8 is typically composed of a collection communication-products, such as repeaters, bridges, fibre-optic cabling, coaxial cabling, satellite links, twisted-pair cabling, which interconnect the switching-hardware at each node N1, N2 . . . N5. Typically, switching-products and communication-products are chosen to include strategies for back-up protection, restoration strategies and band-width capacities between each link L1, L2, . . . L8. Accordingly, each switching-product and communication-product can be represented as product information. Other product information can be provided, as will occur to those of skill in the art.

In turn, processing unit 24 is also operable to present network 40, including the product information associated therewith, on monitor 26, to collectively present an overall network topology.

Hard-disc 32 is operable to store a data-base of product-reliability models that correspond with each product that can be incorporated into network 40. As known to those of skill in the art, such a database of product-reliability models can be obtained by using, for example, Markov Reliability Models to determine the various failure modes of the switching-products associated with each node N1, N2 . . . N5, each communication-products associated with each link L1, L2, . . . L8, and/or any other product associated with network 40.

Processing unit 24 is further operable to access hard-disc 32 to retrieve the product-reliability models associated with received product information, and perform one or more operations that determine overall client-reliability parameters for each node N1, N2 . . . N5 and each link L1, L2, . . . L8, respectively. The client-reliability parameters which reflect the views of three classes of network clients: end-users, other network providers and network operators, is determined by calculating product-integrity, network-integrity and support service-integrity parameters.

A presently preferred list of product-integrity parameters determinable by processing unit 24 is shown in Table I.

TABLE I

Product-Integrity Parameters

| Parameter Name | Parameter Definition |
| --- | --- |
| Service-affecting failure rate | Failure frequency of faults that affect the service being provided by the hardware. |
| Service Failure duration | The duration that the failure impacts the service. |
| Fault detection coverage | Proportion of the failure rate that is successfully detected and recovered in a fault tolerant system. |
| Unplanned and planned maintenance actions | Frequency of maintenance activities to correct failures or to prevent their occurrence. |
| Equipment fault isolation | The ability to isolate product faults to a replaceable unit. |
| Mean-time-to-repair | The average time it takes to repair a product excluding travel time. |
| Percent defective software loads | Proportion of the software loads that have defects at time of insertion |
| Percent failed software load insertions | Proportion of the software loads that fail to insert. |

Other suitable product-integrity parameters will occur to those of skill in the art.

Processing unit 24 is further operable to determine network-integrity parameters for network 40. A presently preferred list of network-integrity parameters determinable by processing unit 24 is shown in Table II.

TABLE II

Network-Integrity Parameters

| Parameter Name | Parameter Definition |
| --- | --- |
| Link and node restoration time | The amount of time to detect a fault and restore traffic that was impacted by the fault. |
| Network fault recovery coverage | The proportion of the network failure rate that is successfully detected and restored. |
| Network failure containment | The proportion of network failures whose failure and recovery impact is contained to the area of failure without impacting other parts of the network. |
| Network fault isolation | The ability to remotely isolate faults to a link or node. |

Other suitable network-integrity parameters will occur to those of skill in the art.

Processing unit 24 is further operable to determine support services-integrity parameters for network 40. A presently preferred list of support services-integrity parameters determinable by processing unit 24 is shown in Table III.

TABLE III

Support Services Integrity Parameters

| Parameter Name | Parameter Definition |
| --- | --- |
| Support Availability | The proportion of the time customer support is available. |
| Support Responsiveness | The time to respond and successfully correct a network failure. (requirements set based on failure criticality |
| Fix Responsiveness | The time to implement a corrective action to prevent the network fault. |
| Fix Quality | The percentage of corrective fixes that are successful. |

Processing unit 24 is further operable to determine client-reliability measurements for network 40 based on previously-determined product, network and support service parameters. Various different types of client-reliability parameters can be generated, depending on the type of client. Where the client is the final end-user of network 40, a presently preferred list of client-reliability parameters determinable by processing unit 24 is shown in Table IV.

TABLE IV

Client-reliability Parameters
(where client is the end-user of the network)

| Parameter Name | Parameter Definition |
| --- | --- |
| User service downtime | Proportion of the time that users experience loss of network service for periods greater than $t_d$ seconds, where $t_d$ is the amount of time a users consider their service to be unavailable. |
| User service denial probability | Percentage of failed service access attempts |
| Failed Information Transfer | Percentage of failed information transfers. |
| User service dropped session probability | Percentage of dropped connections |
| Failed Connection Termination Probability | Percent of failed termination attempts. |

Where the client is a network service-provider, who provides networks to the final end-user of network 40, then a presently preferred list of client-reliability parameters determinable by processing unit 24 is shown in Table V.

TABLE V

Client-reliability Parameters
(where client is the a network service-provider)

| Parameter Name | Parameter Definition |
| --- | --- |
| Catastrophic network outage downtime | Proportion of time the entire network is unavailable to the network provider to transport packets for periods greater than $t_d$ seconds, where $t_d$ is the amount of time a users consider their service to be unavailable |
| Critical user downtime | Proportion of time a group of 30,000 or more users experience loss of network service for periods greater than $t_d$ seconds, where $t_d$ is the amount of time users consider their service to be unavailable. |

TABLE V-continued

Client-reliability Parameters
(where client is the a network service-provider)

| Parameter Name | Parameter Definition |
| --- | --- |
| Network Path Service Downtime | Proportion of the time that a specific individual path across the network is unavailable for periods greater than $t_d$ seconds, where $t_d$ is the amount of time a users consider their service to be unavailable. |
| Network Path Service Failure Rate | Frequency of failure of a specific individual path across the network that lasts longer than $t_f$ seconds, where $t_f$ is the minimum network outage duration required to cause a service to be disconnected or to experience a service denial. |
| Total Maintenance Action Costs | Planned and unplanned maintenance action costs. |
| Spares Inventory Costs | The spare inventory costs to maintain the network |
| Installation and commissioning quality cost | Cost associated with correcting defective units at installation and commissioning. |

Where the client is a network operator, who manages billing and maintenance of the network, then a presently preferred list of client-reliability parameters determinable by processing unit 24 is shown in Table VI.

TABLE VI

Client-reliability Parameters
(where client is the a network operator)

| Parameter Name | Parameter Definition |
| --- | --- |
| Billing Downtime | Proportion of the time the billing function is down where billing data is lost. |
| Catastrophic Loss of Control Downtime | Proportion of time the network management function is unavailable for periods greater than 60 seconds. |
| Major Loss of Control Downtime | Proportion of time individual network hardware cannot be remotely managed for periods greater than 60 seconds. |
| Capacity Reduction Time | Proportion of time the network operates with reduced capacity for periods greater than $t_c$ seconds. (expressed per reduction amount). |

Other client-reliability parameters will occur to those of skill in the art.

Figure 3:
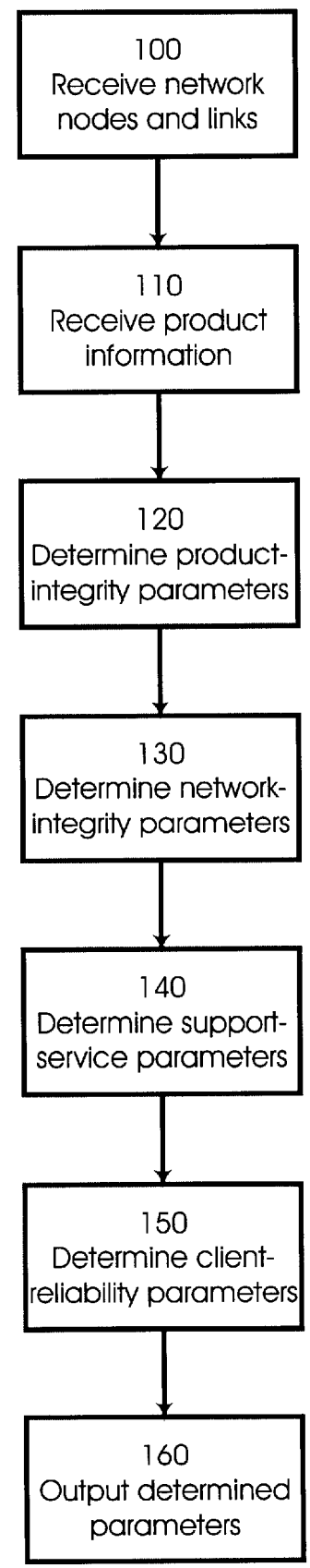
FIG. 3 is a flow-chart of a method in accordance with another embodiment of the invention; and, FIG. 4 is a flow-chart of a method in accordance with another embodiment of the invention.

In another embodiment of the invention, a presently preferred method of operating system 20 is shown in FIG. 3. At step 100, data representative of a network of nodes and links is inputted into or received by processor 24 using keyboard 28 and/or mouse 30. As previously discussed, an exemplary network 40 is shown in FIG. 2 having a plurality of nodes N1, N2 . . . N5 interconnected by at least one link L1, L2, . . . L8. It will be understood, however, that any network of nodes and links can be input.

At step 110, product information used to implement network 40 is received by processor 24 using keyboard and/or mouse 30 to create input. As previously discussed, such product information usually includes the switching-products that make up each node N1, N2, . . . N5 and the communication-products that make up each link L1, L2, . . . L8.

At step 120, the product-integrity parameters for each node N1, N2, . . . N5 and each link L1, L2, . . . L8 in network 40 is determined. In a present embodiment, processor 24 accesses the data-base of product-reliability models stored on hard-disc 32 to obtain a product-reliability model for each product used in network 40. An operation is then performed that considers the retrieved product-reliability models and the product information (provided at step 110) of each node N1, N2, . . . N5 and each link L1, L2, . . . L8 to determine product-integrity parameters for each node N1, N2, . . . N5 and each link L1, L2, . . . L8, respectively. A presently preferred list of product-integrity parameters is shown in Table I, as previously discussed.

Next, at step 130, the network-integrity parameters for network 40 are determined. In a present embodiment, processor 24 performs an operation that considers the product-integrity parameters determined at step 120 and the overall interconnection of each node N1, N2, . . . N5 and each link L1, L2, . . . L8 to determine overall network-integrity parameters for network 40. A presently preferred list of network-integrity parameters is shown in Table II, as previously discussed.

Next, at step 140, the support-service parameters for network 40 are determined. In a present embodiment, processor 24 performs an operation that considers the previously determined parameters from steps 120–130, and the overall interconnection of each node N1, N2, . . . N5 and each link L1, L2, . . . L8 to determine overall network-integrity parameters for network 40. A presently preferred list of support-service parameters is shown in Table III, as previously discussed.

At step 150, the client-reliability parameters for network 40 are determined. In a present embodiment, processor 24 performs an operation that considers previously determined parameters from steps 120–140, and the overall interconnection of each node N1, N2, . . . N5 and each link L1, L2, . . . L8 to determine overall client-reliability parameters for network 40. Presently preferred lists of client-reliability parameters are shown in Tables IV–VI, as previously discussed.

At step 160, the parameters determined at steps 120–150 are then output onto monitor 26 or another suitable output device to be interpreted and/or utilised by a user of system 20. It is contemplated that the parameters can be output in a manner that associates the results with the graphical representation of network 40 shown in FIG. 2, as desired.

It will now be apparent that the method shown in FIG. 3 can be used and/or varied in a variety of different ways. For instance, the method need only determine and/or output one of the sets of parameters determined at steps 120–150, as desired. Where network 40 is being designed, monitored, varied or optimised for a final end-user, then only the set of client-reliability parameters shown in Table IV need be determined. The method can be used to optimize network design to meet client requirements for an existing network when the product-integrity parameters cannot be changed. Or it can be used to determine requirements for yet to be designed products and networks for various types of client-requirements.

Figure 4:
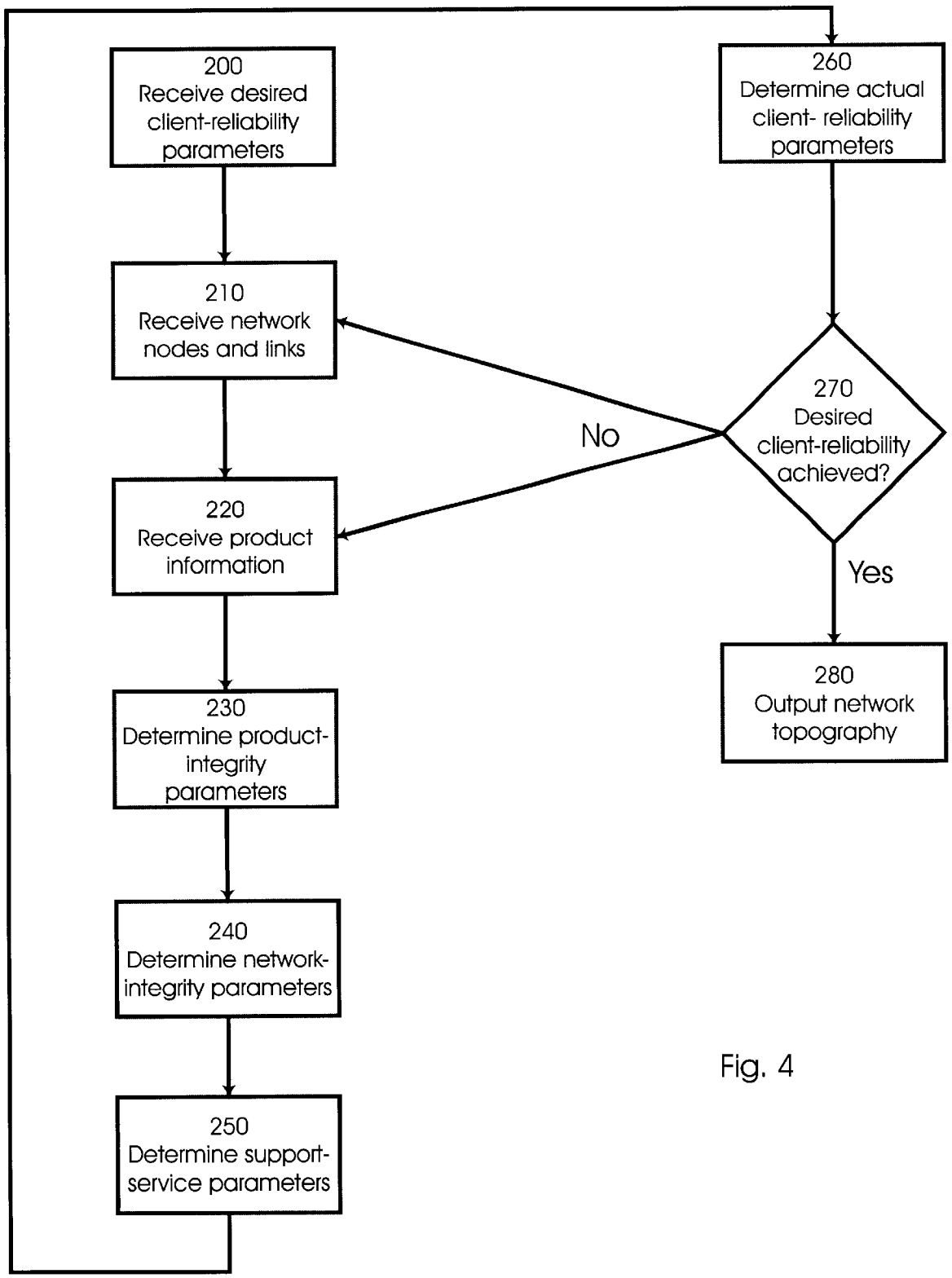

Another embodiment of the invention is a method for designing a network as shown in FIG. 4. At step 200, a set of desired client-reliability parameters are received, typically from the client. It is presently preferred that such desired client-reliability parameters be in one or more of the forms specified in Tables III–V. The desired client-reliability parameters can be obtained by interviewing, for example, the final end-user of the network to determine the particular needs of the end-user. Typically, such desired client-reliability parameters can be obtained during negotiations for a service agreement ("SA") between the network service provider and the end-user. These desired client-reliability parameters are then inputted into processor 24 via keyboard 28 and/or mouse 30.

Steps 210–Steps 260 of the method shown in FIG. 4 are substantially identical to steps 100–150, respectively, from the method shown in FIG. 3. Generally, a proposed network of nodes and links is input at step 210, and proposed product information associated with the proposed network is input at step 220. At steps 230–250, the product reliability parameters, network-integrity parameters, support service-reliability parameters are determined, respectively, based on the proposed network and hardware from steps 210 and 220, respectively and used to determine the client-reliability parameters at step 260. Next, at step 270, the desired client-reliability parameters from step 200 are compared with the determined client-reliability parameters from step 260. If it is determined that the desired level of client-reliability has been achieved, then the method moves to step 280 and the network topography from steps 210 and 220 is outputted for use and/or implementation.

However, if, during the comparison at step 270, the desired level of client-reliability has not been achieved, then the method returns to either step 210 where the network of nodes and links are varied, or to step 220 where the product information associated with the the nodes and links is varied. The inputs at either or both of step 210 and 220 can be varied based on the comparison at step 270, with a view towards iteratively improving the configuration of the network in order to bring the determined client-reliability parameters (at step 260) closer to the desired client-reliability parameters (from step 200). Thus, having varied or modified the inputs at step 210 and/or step 220, the method returns to steps 230–270, where the new determined client-reliability parameters from step 270 is compared with the desired client-reliability parameters of step 200. These steps are repeated until the desired level of client-reliability has been achieved, and so the method can proceed to step 280 and output the final network topography.

It will now be apparent that the method from FIG. 4 can also be varied and that such variations are within the scope of the invention. For example, the iterative variations to the network at step 210 and the product at step 220 can either be manually determined by a user operating system 20, or then can be automatically determined by processor 24. When performed automatically, processor 24 can, for example, utilise the database of product-reliability models stored on hard-disc 32 to perform operations that select products with different levels of reliability. Other databases can be stored on hard-disc 32, and more sophisticated operations can be incorporated into processing unit 24 in order to determine the most appropriate network based on the desired client-reliability parameters. For example, capital cost and/or maintenance cost data can be associated with product-reliability parameters and network-reliability parameters, in order to determine costs associated with the desired client-reliability parameters. Such cost information can be then used to set service agreements with the client based on network maintenance costs.

Furthermore, certain parameters can be fixed, so the that the remaining parameters are determined based on the fixed parameters. For example, while the method of FIG. 4 contemplates that the support-services parameters are determined at step 250, in other embodiments it is contemplated that the support services parameters may be fixed or predefined, and received as input. The remaining parameters can then be determined based on one or more operations that consider, at least in part, the support services parameters. Accordingly, the user can also vary the support-services parameters to design a network that achieves desired client-reliability parameters. Other variations on the method of FIG. 4 will now be apparent to those of skill in the art.

While only specific combinations of the various features and components of the present invention have been discussed herein, it will be apparent to those of skill in the art that desired sub-sets of the disclosed features and components and/or alternative combinations of these features and components can be utilized, as desired. For example, other types of parameters and/or metrics can be included, as desired.

It is contemplated that the various parameters described herein can be incorporated into an industry-wide standard that defines reliability and quality of service for multi-services networks terms and metrics, and that such a standard is within the scope of the invention.

It is further contemplated that a business method of receiving a set of specifications or parameters from an end-user or other type of client, that is used to design the overall system is also within the scope of the invention.

It is contemplated that the present invention can also be used as a design tool to efficiently parse one network amongst multiple users. For example, a first user with high reliability requirements can share the same network with a second user with low reliability requirements, by prioritising the packets of each user in accordance the user's prescribed requirements. When the network is operating at full capacity, the network may carry each of the user's packets without regard to priority. However, when the network is operating at a reduced capacity due to a failure-mode, then the first user's packets can be prioritised for delivery over the needs of the second user's packets. Accordingly, fees can be charged that increase overall profitability of the network and yet appropriately reflect the user's requirements. Other variations on the foregoing scenario will now be apparent to those of skill in the art.

In addition, it is contemplated that the present invention can be utilised to monitor whether the operation of a given network complies with a given service agreement, and that the network can be appropriately modified to more accurately reflect the terms of the service agreement. For example, where the service agreement stipulates that there shall only be one five-minute outage over the first year of the agreement, and such an outage occurs within one month of the execution of the agreement, then the present invention can be used to select a more robust network which an be utilised for the remainder of the service agreement in order to assure compliance therewith. Packet prioritisation can also be used in this scenario to automatically effect such network changes through software.

The present invention provides a novel system and method for designing, modifying, monitoring and/or optimising networks. A set or sets of standardised parameters can be used to describe network reliability from the perspective of a number of different parties, including network customers, network clients, network providers, network designers, network service providers and the like. A standardised set of metrics or parameters from the perspective of one party are readily convertible to the perspective of another party, and thus the needs of, for example, network clients can be readily converted into design specifications for network designers

We claim:

1. A method of designing a network for a network client, comprising the steps of:
   receiving desired client reliability parameters associated with a service agreement;
   receiving product information on a network, which has a plurality of nodes and links;
   providing said product information to a product-integrity model and producing product-integrity parameters for said network; said product-integrity parameters comprising one or more of service-affecting failure rate, service failure duration, fault detection coverage, unplanned and planned maintenance actions, equipment fault isolation, mean-time-to-repair, percent defective software loads or percent failed software load insertions;
   based on said product-integrity parameters, producing network-integrity parameters for said network; said network-integrity parameters comprising one or more of link and node restoration time, network fault recovery coverage, network failure containment or network fault isolation;
   based on said product-integrity and said network-integrity parameters, producing support services-integrity parameters for said network; said support services-integrity parameters comprising one or more of: support availability, support responsiveness, fix responsiveness, or fix quality;
   based on said product-integrity, network-integrity and support services-integrity parameters, producing actual client-reliability parameters for said network; and
   based on said actual client-reliability parameters, determining whether said service agreement is achieved in said network;
   said support services-integrity parameters are selected from the group consisting of support availability, support responsiveness, fix responsiveness, and fix quality.

2. A method of claim 1, wherein the step of producing actual client-reliability parameters produces said actual client-reliability parameters associated with a class of the network client.

3. A method of claim 2, wherein said class of the network client is selected from the group consisting of an end-user, a network operator and a network service provider.

4. A method of claim 3, wherein said service agreement is between said network service provider and said end-user.

5. A method of claim 3, wherein said client reliability parameters associated with said end-user are selected from the group consisting of user service downtime, user service denial probability, failed information transfer, user service dropped session probability, and failed connection termination probability.

6. A method of claim 3, wherein said client reliability parameters associated with said network service provider are selected from the group consisting of catastrophic network outage downtime, critical user downtime, network path service downtime, network path service failure rate, total maintenance action costs, spares inventory costs, and installation and commissioning quality cost.

7. A method of claim 3, wherein said client reliability parameters associated with said network operator provider are selected from the group consisting of billing downtime, catastrophic loss of control downtime, major loss of control downtime and capacity reduction time.

8. A method of claim 1, wherein the step of determining comprises the step of comparing said desired client-reliability parameters with said actual client-reliability parameters.

9. A method of claim 8, further comprising the step of outputting network topography when the determining step determines, based on the comparison, that said desired client-reliability parameters are achieved in said network.

10. A method of claim further comprising the steps of
    changing said network when the determining step determines, based on the comparison, that said desired client-reliability parameters are not achieved in said network, and based on information on said changed network, repeating said producing steps to provide new actual client-reliability parameters.

11. A method of claim 10, wherein said network includes said nodes, said links and at least one product applied to said node or link, the changing step changing said node, said link or said product.

12. A method of claim 1, further comprising the steps of:
receiving predetermined product-integrity parameters; and
providing said predetermined product-integrity parameters to said product-integrity model.

13. A method of claim 12, further comprising the step of:
changing at least one of said predetermined product-integrity parameters.

14. A method of claim 1, further comprising the steps of:
receiving predetermined network-integrity parameters; and
fixing said network-integrity parameters to said predetermined network-integrity parameters.

15. A method of claim 1, further comprising the step of:
changing at least one of said predetermined network-integrity parameters.

16. A method of claim 14, further comprising the step of:
changing at least one of said predetermined support services-integrity parameters.

17. A method of claim 1, further comprising the steps of:
receiving predetermined support services-integrity parameters; and
fixing said support services-integrity parameters to said predetermined support services-integrity parameters.

18. A method of claim 1, wherein said product-integrity parameters are selected from the group consisting of service-affecting failure rate, service failure duration, fault detection coverage, unplanned and planned maintenance actions, equipment fault isolation, mean-time-to-repair, percent defective software loads and percent failed software load insertions.

19. A method of claim 1, wherein said network-integrity parameters are selected from the group consisting of link and node restoration time, network fault recovery coverage, network failure containment and network fault isolation.

20. A method of claim 1, wherein said support services-integrity parameters are selected from the group consisting of support availability, support responsiveness, fix responsiveness, and fix quality.

21. A method of providing reliability parameters of a network for a network client, comprising:
receiving product information on a network, which includes a plurality of nodes and links;
providing said product information to a product-integrity model and producing product-integrity parameters for said network; said product-integrity parameters comprising one or more of service-affecting failure rate, service failure duration, fault detection coverage, unplanned and planned maintenance actions, equipment fault isolation, mean-time-to-repair, percent defective software loads or percent failed software load insertions;
based on said product-integrity parameters, producing network-integrity parameters for said network; said network-integrity parameters comprising one or more of link and node restoration time, network fault recovery coverage, network failure containment or network fault isolation;
based on said product-integrity and said network-integrity parameters, producing support services-integrity parameters for said network; said support services-integrity parameters comprising one or more of support availability, support responsiveness, fix responsiveness, or fix quality; and
based on said product-integrity, network-integrity and support services-integrity parameters, producing client-reliability parameters associated with a class of the network client.

22. A method of claim 21, wherein said class is selected from the group consisting of an end-user, a network operator and a network service provider.

23. A method of claim 22, wherein said client reliability parameters associated with said end-user are selected from the group consisting of user service downtime, user service denial probability, failed information transfer, user service dropped session probability, and failed connection termination probability.

24. A method of claim 22, wherein said client reliability parameters associated with said network service provider are selected from the group consisting of catastrophic network outage down time, critical user downtime, network path service downtime, network path service failure rate, total maintenance action costs, spares inventory costs, and installation and commissioning quality cost.

25. A method of claim 22, wherein said client reliability parameters associated with said network operator provider are selected from the group consisting of billing downtime, catastrophic loss of control downtime, major loss of control downtime and capacity reduction time.

26. A method of claim 21, further comprising the steps of:
receiving predetermined product-integrity parameters; and
providing said predetermined product-integrity parameters to said product-integrity model.

27. A method of claim 21, further comprising the steps of:
receiving predetermined network-integrity parameters; and
fixing said network-integrity parameters to said predetermined network-integrity parameters.

28. A method of claim 21, further comprising the steps of:
receiving predetermined support services-integrity parameters; and
fixing said support services-integrity parameters to said predetermined support services-integrity parameters.

29. A method of claim 21, wherein said product-integrity parameters are selected from the group consisting of service-affecting failure rate, service failure duration, fault detection coverage, unplanned and planned maintenance actions, equipment fault isolation, mean-time-to-repair, percent defective software loads and percent failed software load insertions.

30. A method of claim 21, wherein said network-integrity parameters are selected from the group consisting of link and node restoration time, network fault recovery coverage, network failure containment and network fault isolation.

31. A method of claim 21, wherein said support services-integrity parameters are selected from the group consisting of support availability, support responsiveness, fix responsiveness, and fix quality.

* * * * *